(12) United States Patent
Dobosz et al.

(10) Patent No.: US 7,633,709 B1
(45) Date of Patent: Dec. 15, 2009

(54) DISK DRIVE BASEPLATE WITH COOLING RIBS

(75) Inventors: Stanislaw Dobosz, Shrewsbury, MA (US); Edward Acciardi, Grafton, MA (US); A. David L. Michael, Auburndale, MA (US)

(73) Assignee: Maxtor Corporation, Longmont, CO (US)

( * ) Notice: Subject to any disclaimer, the term of this patent is extended or adjusted under 35 U.S.C. 154(b) by 331 days.

(21) Appl. No.: 11/556,067

(22) Filed: Nov. 2, 2006

Related U.S. Application Data

(60) Provisional application No. 60/732,996, filed on Nov. 3, 2005, provisional application No. 60/821,427, filed on Aug. 4, 2006.

(51) Int. Cl.
*G11B 33/14* (2006.01)
*G11B 25/04* (2006.01)

(52) U.S. Cl. .................. 360/97.02; 361/720

(58) Field of Classification Search .............. 360/97.02, 360/97.03; 361/685; 165/80.3
See application file for complete search history.

(56) References Cited

U.S. PATENT DOCUMENTS

| | | | | |
|---|---|---|---|---|
| 5,870,247 | A | * | 2/1999 | Schirle .................... 360/97.02 |
| 5,927,386 | A | * | 7/1999 | Lin ............................ 165/80.3 |
| 6,426,847 | B1 | * | 7/2002 | Dague et al. ............. 360/97.01 |
| 6,788,493 | B1 | | 9/2004 | Subramaniam et al. |

* cited by examiner

*Primary Examiner*—Craig A Renner
*Assistant Examiner*—Tamara Ashford
(74) *Attorney, Agent, or Firm*—Shumaker & Sieffert, P.A.

(57) ABSTRACT

A disk drive base plate (150) that incorporates a plurality of cooling ribs (170) on its bottom (154) is disclosed. In the illustrated embodiment, all of these cooling ribs (170) are disposed in parallel relation, and are oriented parallel to an airflow past the disk drive base plate (150). An exposed primary surface (184) of a printed circuit board (182) is coplanar with base sections (178) associated with the cooling ribs (170).

17 Claims, 9 Drawing Sheets

DISK DRIVE BASEPLATE WITH COOLING RIBS

CROSS-REFERENCE TO RELATED APPLICATIONS

This patent application claims priority under 35 U.S.C. §119(e) to U.S. Provisional Patent Application Ser. No. 60/732,996, that was filed on Nov. 3, 2005, and that is entitled "Disk Drive Bottom Surface Cooling Ribs," as well as to U.S. Provisional Patent Application Ser. No. 60/821,427, that was filed on Aug. 4, 2006, and that is entitled "Disk Drive Baseplate with Cooling Ribs." The entire disclosure of each of the above-noted patent applications is hereby incorporated by reference in their entirety herein.

FIELD OF THE INVENTION

The present invention generally relates to disk drives and, more particularly, to disk drive temperature management.

BACKGROUND OF THE INVENTION

Disk drives typically include a base plate and a detachable cover that collectively define a housing for the various disk drive components. Operation of the disk drive of course generates heat. It is desirable to dissipate this heat. One prior art approach is to direct an airflow over the disk drive housing during disk drive operations.

SUMMARY OF THE INVENTION

A first aspect of the present invention is generally directed to disk drive base plate. This disk drive base plate includes a bottom, which in turn incorporates a plurality of cooling ribs. The top of the disk drive base plate (oppositely disposed from the noted bottom) includes a cavity for receipt of disk drive components, and thereby may be referred to as a disk drive component cavity.

Various refinements exist of the features noted in relation to the first aspect of the present invention. Further features may also be incorporated in the first aspect of the present invention as well. These refinements and additional features may exist individually or in any combination. The disk drive base plate may be formed from any appropriate material or combination of materials, may be fabricated in any appropriate manner (e.g., die cast), or both. Moreover, the disk drive base plate may be of any appropriate size, shape, and/or configuration, and may accommodate any appropriate arrangement of disk drive components of any appropriate size, shape, configuration, and/or type (e.g., one or more data storage disks, a head positioner assembly including one or more head-gimbal assemblies).

Each of the various cooling ribs on the bottom of the disk drive base plate in the case of the first aspect may be characterized as: 1) being axially extending; 2) being disposed in parallel relation: 3) having a length dimension that extends in a direction of an airflow in which the disk drive base plate may be disposed; 4) being disposed in a common orientation; 5) being spaced from each other; 6) being disposed under a heat generating region of the base plate when disk drive components are installed within the base plate (e.g., under at least a portion of a spindle motor); and 7) any combination of the foregoing. Although each of the various cooling ribs may be of the same size, shape, and/or configuration, such is not required (e.g., each individual cooling rib may be of any appropriate size, shape, and/or configuration). Moreover, although the various cooling ribs may be disposed an equally spaced relation, such is also not required.

In one embodiment of the first aspect, a printed circuit board is mounted to the bottom of the disk drive base plate outside of a region that has the various cooling ribs. The various cooling ribs may occupy a substantial portion of the bottom of the disk drive base plate that is not occupied by the printed circuit board, although such may not be required in all instances. Adjacent pairs of cooling ribs may be separated by a groove, by a base section, or by an open space. Stated another way, an adjacent pair of cooling ribs and an intermediate base section that extends therebetween may collectively define a groove. In any case and in one embodiment, the surface of the printed circuit board that faces away from the bottom of the disk drive base plate may be parallel with each of the various base sections disposed between adjacent pairs cooling ribs, although such may not be required in all instances. In another embodiment, the tallest component that is mounted on the printed circuit board may be coplanar with an apex of each of the plurality of cooling ribs, although such may not be required in all instances. In yet another embodiment, an apex of each of the various cooling ribs on the bottom of the disk drive base plate may be contained within a common reference plane, and each component that is mounted on the printed circuit board may fail to protrude beyond this reference plane.

A disk drive that incorporates the disk drive base plate of the first aspect may be disposed within an enclosure of any appropriate size, shape, configuration, and/or type (e.g., within a laptop housing; within a housing of a desktop computer; within a cabinet that supports one or more disk drives). In any case, a fan or the like may direct an airflow through the enclosure. Preferably, the various cooling ribs on the bottom of the disk drive base plate in the case of the first aspect are oriented so as to be parallel with this airflow.

A second aspect of the present invention may be characterized as a housing assembly. This housing assembly includes a housing, which in turn has a first wall. A plurality of cooling ribs are associated with this first wall. A printed circuit board is mounted on this first wall as well.

Various refinements exist of the features noted in relation to the second aspect of the present invention. Further features may also be incorporated in the second aspect of the present invention as well. These refinements and additional features may exist individually or in any combination. The characterizations presented above with regard to the cooling ribs of the first aspect are equally applicable to the cooling ribs of the second aspect. The housing assembly may be used for any appropriate application, such as for containing disk drive components in the manner discussed above in relation to the first aspect (e.g., the housing of this second aspect may be in the form of the above-noted to disk drive base plate of the first aspect). In any case, the housing may be formed from any appropriate material or combination of materials, may be fabricated in any appropriate manner (e.g., die cast), or both. The housing may be of any appropriate size, shape, and/or configuration. Although the cooling ribs may be integrally formed with the housing, such may not be required in all instances (e.g., the cooling ribs could be separately attached to the housing).

DETAILED DESCRIPTION

Figure 1:
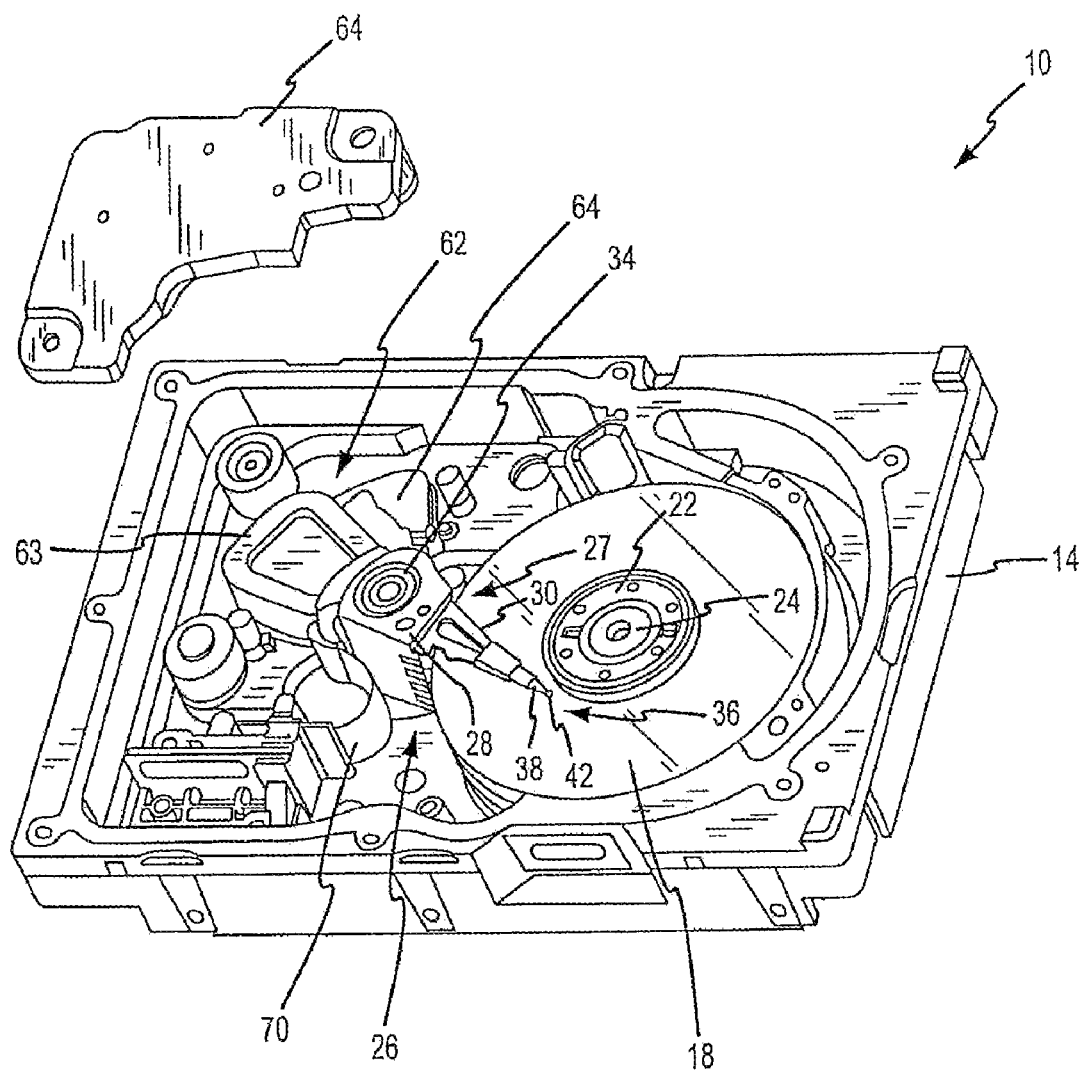
FIG. 1 is a perspective view of a prior art disk drive.
Figure 2:
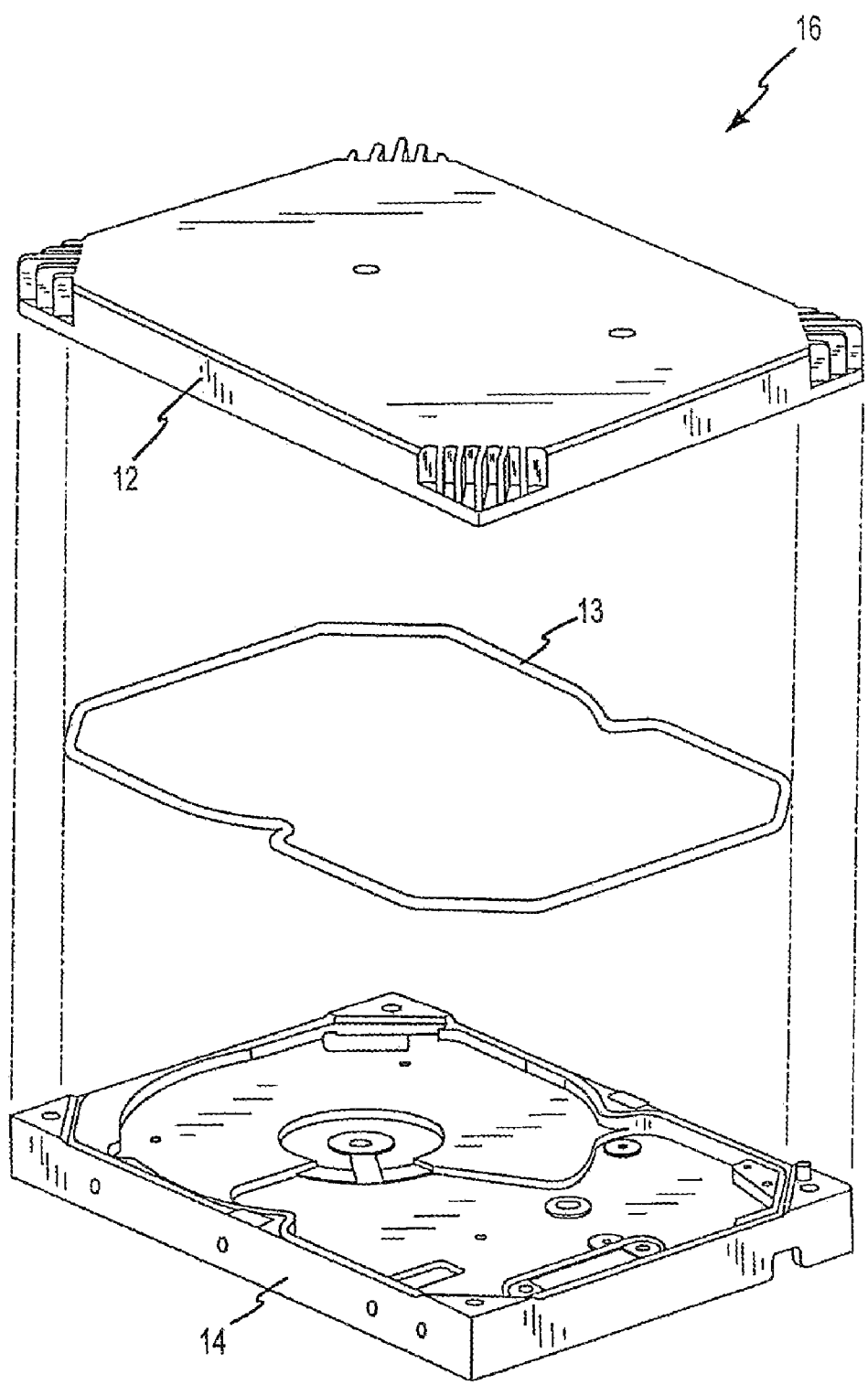
FIG. 2 is an exploded, perspective view of a prior art disk drive housing for the disk drive of FIG. 1.

One embodiment of a prior art disk drive 10 is illustrated in FIGS. 1-4. However, this disk drive 10 may be adapted to incorporate a base plate with cooling ribs on its bottom surface, the combination of which is not in the prior art. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the head positioner assembly 26 is provided by an appropriate head stack assembly drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM magnet assembly") 64 that is disposed above and below this coil 63 (the upper VCM magnet assembly 64 being "exploded away" in FIG. 1). The VCM magnet assemblies 64 will typically be mounted on the housing 16 in a fixed position, with the upper VCM magnet assembly 64 being appropriately supported above the lower VCM magnet assembly 64. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 "across" the corresponding data storage disk 18 to position the head 44 at the desired/required radial position on the disk 18 (i.e., at the correct track on the data storage disk 18) for disk drive read/write operations.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

Figure 3:
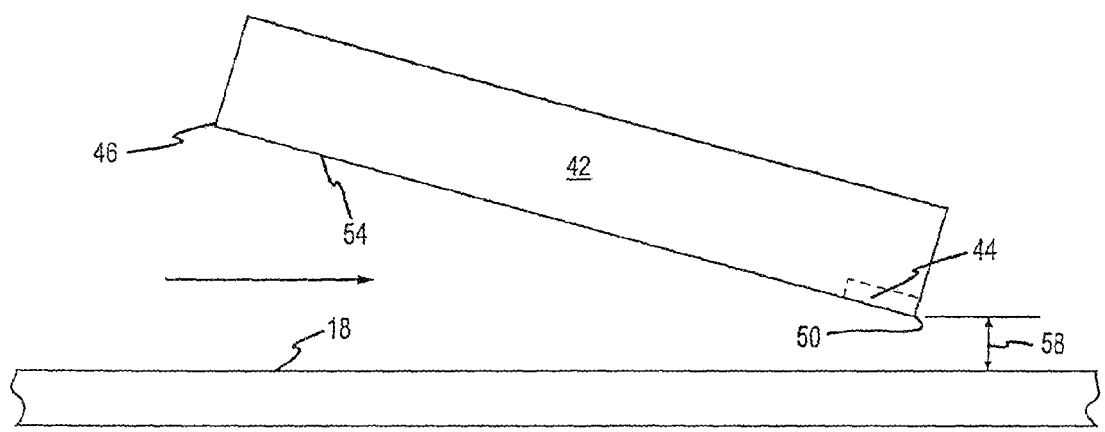
FIG. 3 is a schematic representation of a prior art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
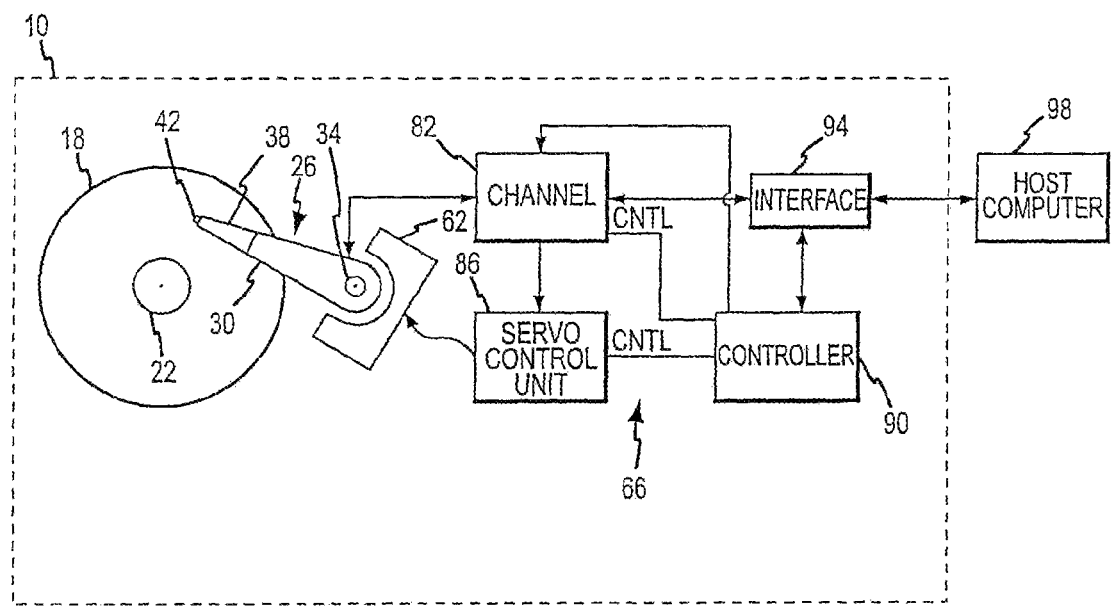
FIG. 4 is a simplified prior art electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

Figure 5A:
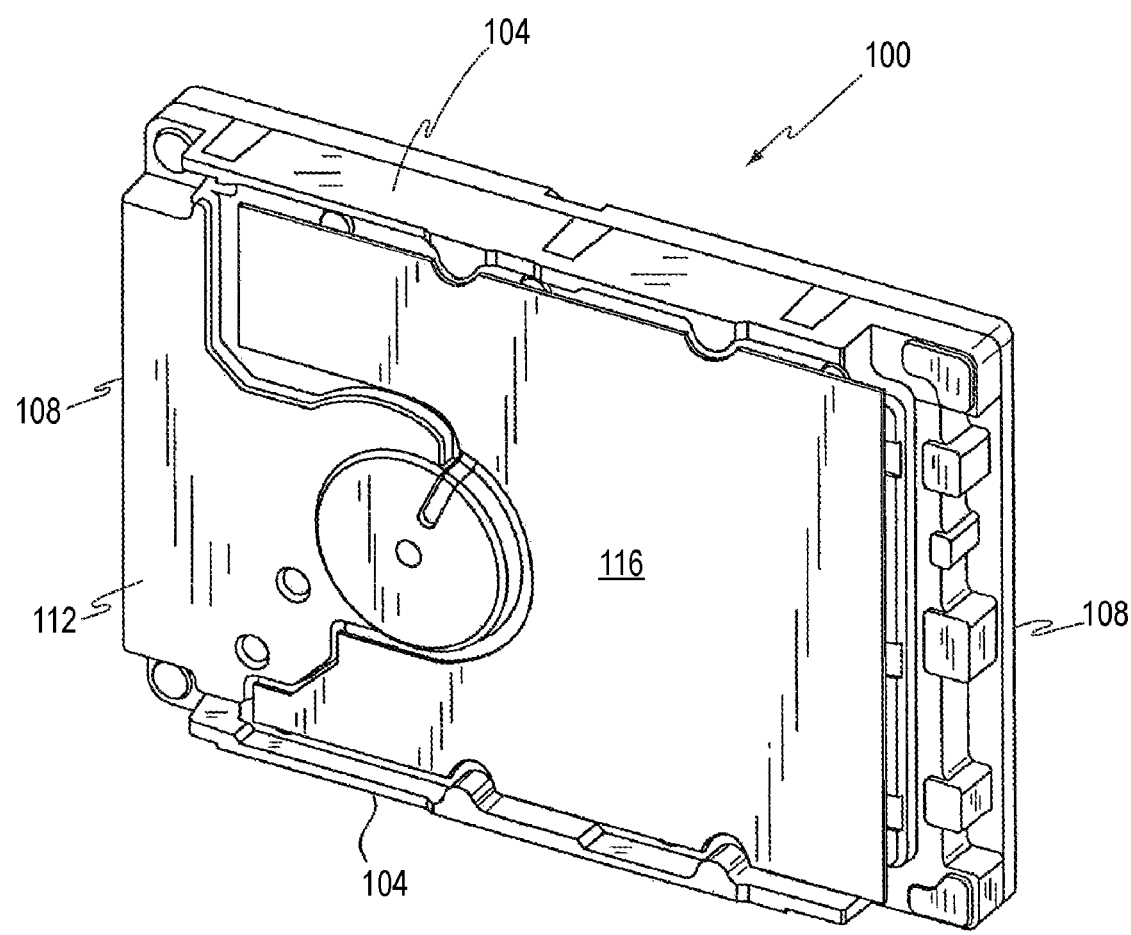
FIG. 5A is a bottom view of a prior art disk drive base plate.

FIG. 5A illustrates a prior art disk drive base plate 100. The disk drive base plate 100 includes a bottom 112, a pair of longitudinally spaced ends 108, and a pair of laterally spaced sides 104. A printed circuit board 116 is mounted on the bottom 112 of the disk drive base plate 100. Various components (not shown) may be mounted on the printed circuit board 116 and that are used in relation to the operation of a disk drive that incorporates disk drive base plate 100. The opposite "side" of the disk drive base plate 100 in relation to the view illustrated in FIG. 5A includes the type of space or cavity used by the base plate 14 of the disk drive 10 of FIG. 1 for housing the same type of disk drive components.

Figure 5B:
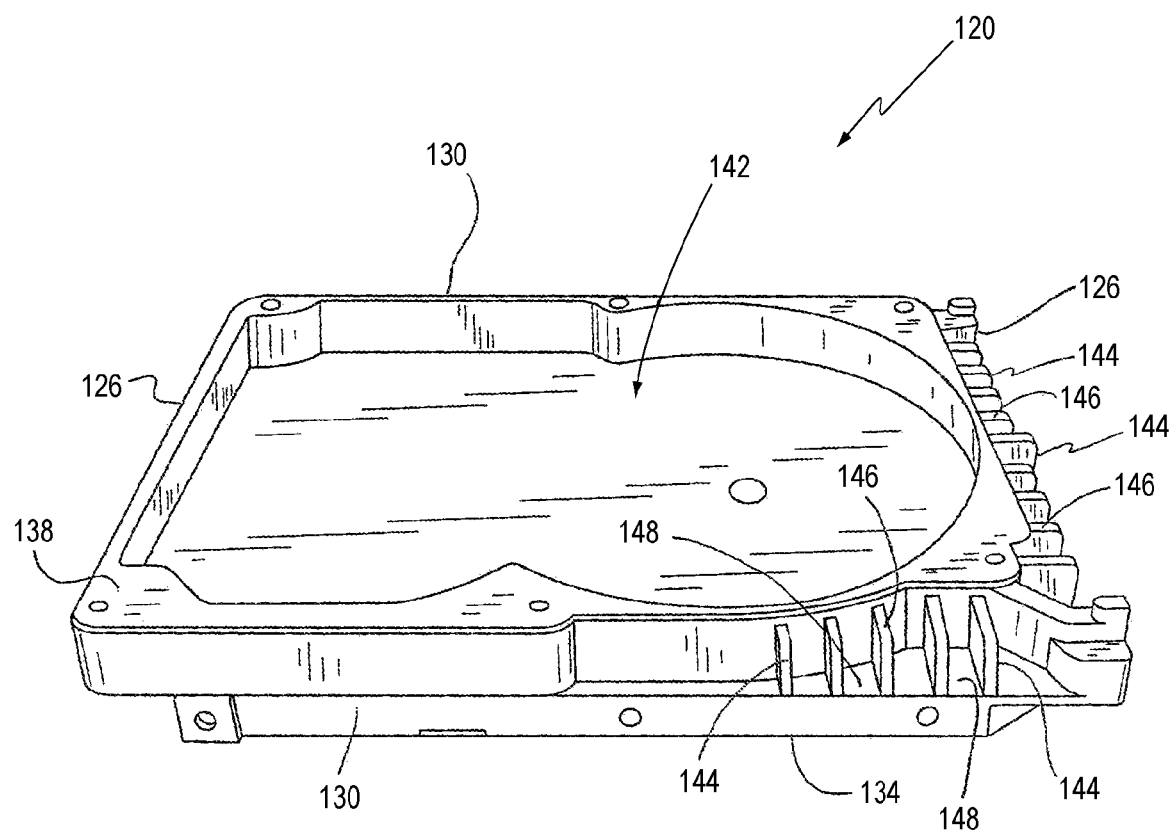
FIG. 5B is a perspective view of the interior of another prior art disk drive base plate.
Figure 6:
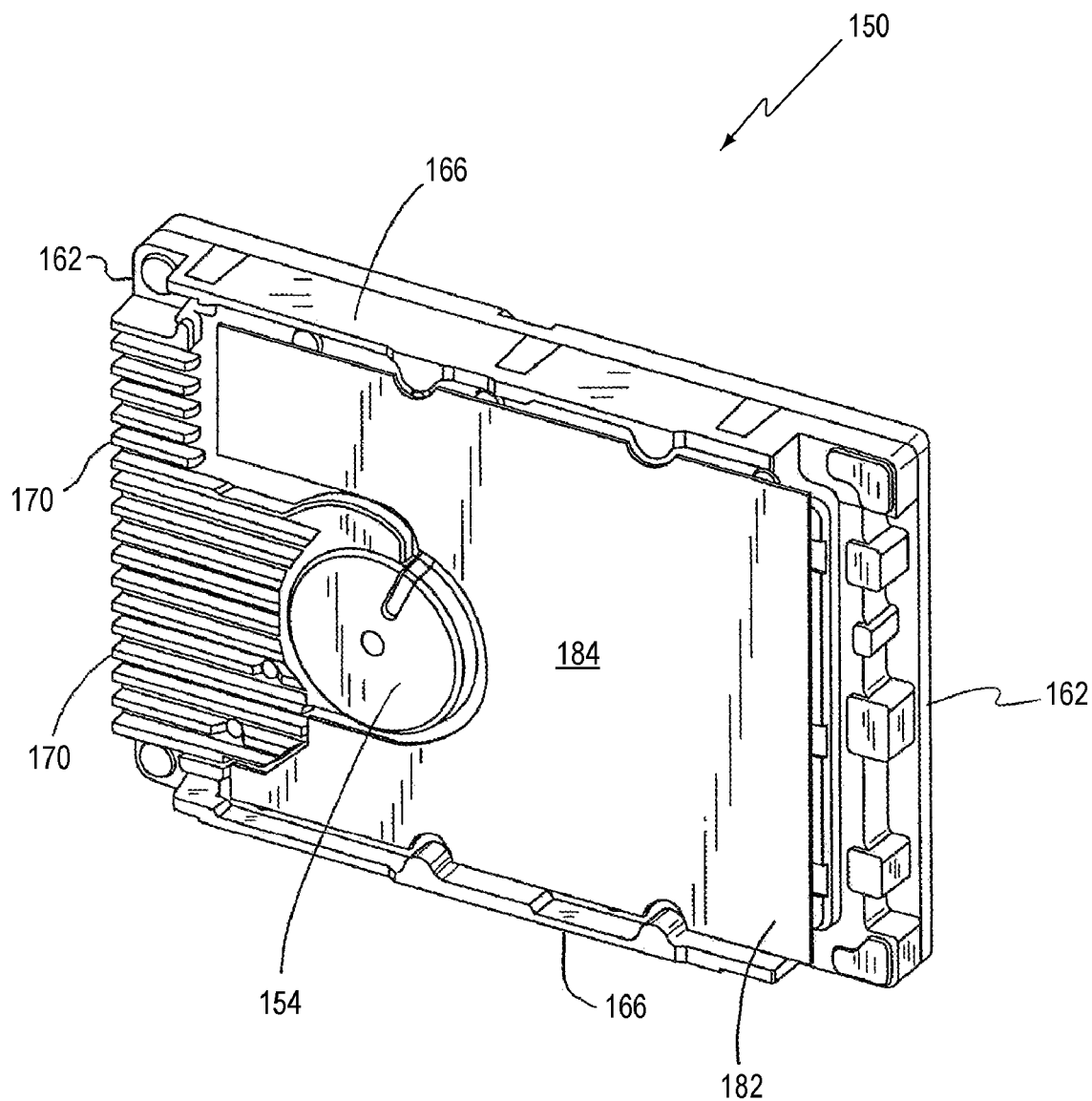
FIG. 6 is a perspective view of a bottom surface of a disk drive base plate that incorporates cooling ribs.

FIG. 5B illustrates another prior art disk drive base plate 120. The disk drive base plate 120 includes a bottom 134 (the "underside" of the disk drive base plate 120 in the view illustrated in FIG. 5B), a pair of longitudinally spaced ends 126, and a pair of laterally spaced sides 130. The disk drive base plate 120 further includes an open top 138 having a space or cavity 142 for receiving the type of disk drive components used by the disk drive 10 of FIG. 1.

A plurality of ribs 144 are incorporated into the structure of the disk drive base plate 120 and are part of its top 138. Adjacent ribs 144 are spaced from each other by a base section 148 that extends between adjacent ribs 144 and that is spaced from an apex 146 of each of these ribs 144. Some of the ribs 144 extend from one of the ends 126 of the disk drive base plate 120 and terminate prior to reaching the disk drive components cavity 142. Other ribs 144 extend from each of the sides 130 of the disk drive base plate 120 and terminate prior to reaching the disk drive components cavity 142. As such, all of the ribs 144 associated with the top 138 of the disk drive base plate 120 are not disposed in a common orientation. Moreover, the ribs 144 extend in a direction that coincides with the direction in which the disk drive components cavity 142 projects. That is, the apex 146 of each rib 144 is spaced from the various base sections 148 in a direction that coincides with the direction in which the disk drive components cavity 142 projects.

FIGS. 6-9 illustrate one embodiment of disk drive base plate 150. The disk drive base plate 150 includes a bottom 154, a pair of longitudinally spaced ends 162, a pair of laterally spaced sides 166, and a top 156 that incorporates a disk drive components cavity 158 (FIG. 9) for containing various disk drive components and which is of the same general type as that illustrated in FIGS. 1 and 5B (e.g., one or more data storage disks, a head positioner assembly that includes one or more head-gimbal assemblies, and the like may be disposed in the disk drive components cavity 158). The spacing between the ends 162 is greater than the spacing between the sides 166 in the illustrated embodiment, although such may not be required in all instances.

The disk drive base plate 150 may be formed from any appropriate material or combination of materials, may be fabricated in any appropriate manner (e.g., die cast), or both. Moreover, the disk drive base plate 150 may be of any appropriate size, shape, and/or configuration, and may accommodate any appropriate arrangement of disk drive components of any appropriate size, shape, configuration, and/or type (e.g., one or more data storage disks, a head positioner assembly including one or more head-gimbal assemblies). For instance, the disk drive components cavity 158 may be of any appropriate size, shape, and/or configuration to accommodate the desired disk drive components and/or disk drive components arrangement.

The bottom 154 of the disk drive base plate 150 includes a plurality of cooling ribs 170 that extend from one end 162 toward, but not to, the opposite end 162. That is, in the illustrated embodiment the cooling ribs 170 are integrally formed with the disk drive base plate 150, although such may not be required in all instances. Each of the various cooling ribs 170 on the bottom 154 may be characterized as linearly or axially extending, as being disposed in a common orientation, as being disposed in parallel relation, or any combination thereof. The various cooling ribs 170 may be of any appropriate size, shape, configuration, and/or cross-sectional profile. Although the cooling ribs 170 are illustrated as being equally spaced from each other, such but not be required in all instances. In the illustrated embodiment, the various cooling ribs 170 are disposed under a common heat source of a disk drive that incorporates the disk drive base plate 150—a spindle motor that is mounted within the disk drive components cavity 158 of the disk drive base plate 150.

Figure 7:
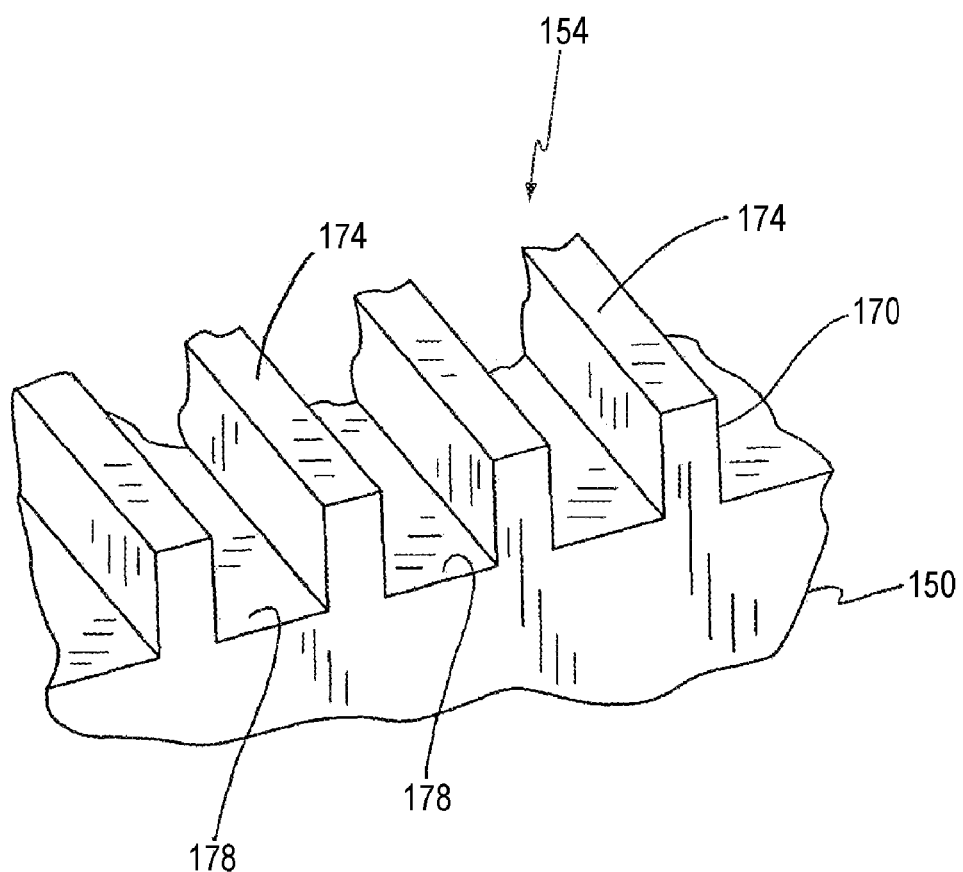
FIG. 7 is a cross-sectional view of a portion of the cooling ribs used by the disk drive base plate of FIG. 6.
Figure 8:
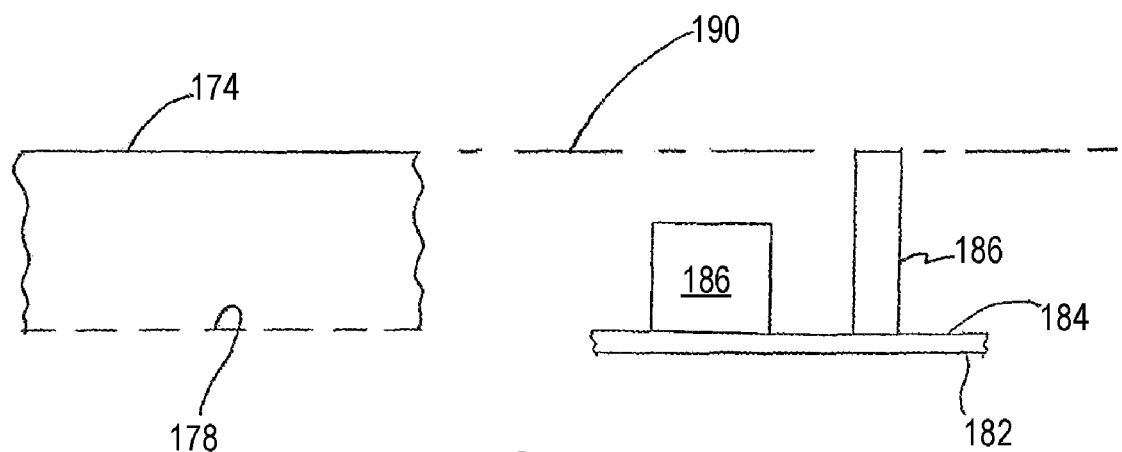
FIG. 8 is a side view of a portion of the disk drive base plate of FIG. 6.

Adjacent pairs of cooling ribs 170 are separated by a base section 178 (e.g., FIG. 7). An apex 174 of each cooling rib 170 is spaced from the various base section 178 in a direction that is opposite of that discussed above in the case of the ribs 144 used by the disk drive base plate 120 of FIG. 5A. That is, each cooling rib 170 extends away from its corresponding base sections 178 in a direction that is opposite that which the disk drive components cavity 158 of the disk drive base plate 150 projects (e.g., the cooling ribs 170 extend "down" when the disk drive components cavity 158 projects "up").

A printed circuit board 182 is mounted on a portion of the bottom 154 of the disk drive base plate 150 that is not occupied by the various cooling ribs 170. In the illustrated embodiment: 1) the exposed primary surface 184 of the printed circuit board 182 (that surface which projects away from the bottom 154 of the disk drive base plate 150) is coplanar with the various base sections 178 associated with the cooling ribs 170, although such may not be required in all instances; and 2) each apex 174 of the various cooling ribs 170 is disposed within a common reference plane 190, and none of the components 186 mounted on the printed circuit board 182 protrude beyond this reference plane 190 in a direction that is opposite of the direction that the disk drive components cavity 158 of the disk drive base plate 150 projects, although such may not be required in all instances. In one embodiment, the tallest component 186 mounted on the printed circuit board 182 is coplanar with this reference plane 190, although such may not be required in all instances.

Figure 9:
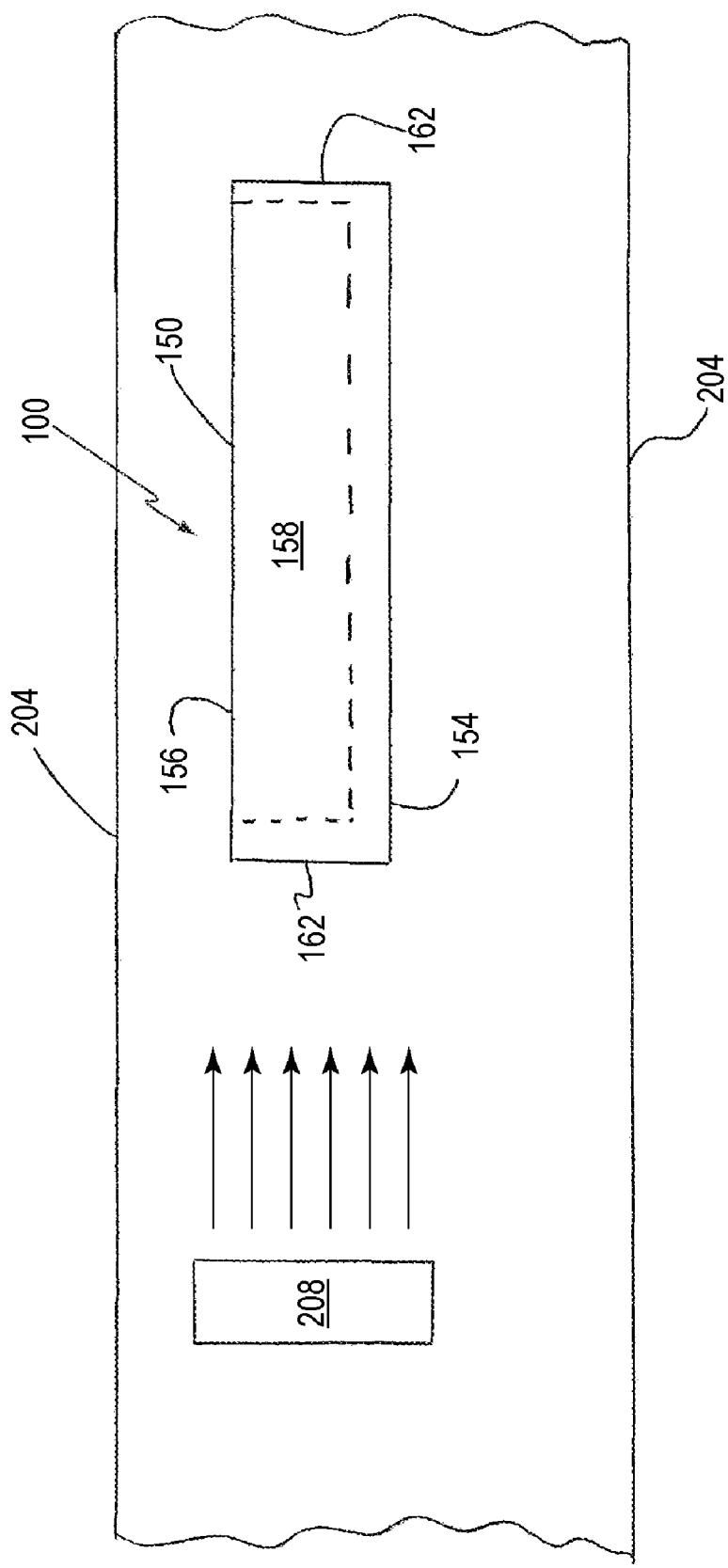
FIG. 9 is a schematic of the disk drive base plate of FIG. 6 in a cabinet.

A disk drive 200 that incorporates the disk drive base plate 150 may be incorporated into an enclosure or cabinet 204 (FIG. 9). This cabinet 204 may be of any appropriate size, shape, configuration, and/or type, and further may contain one or more components in any appropriate arrangement (e.g., one or more disk drives 200). A fan 208 is associated with the cabinet 204 to direct an airflow in a direction that goes from one end 162 of the disk drive base plate 150 to its opposite end 162. Therefore, the cooling ribs 170 incorporated into the bottom 154 of the disk drive base plate 150 are disposed parallel to this airflow. In one embodiment, the disk drive base plate 150 is positioned such that the airflow reaches the cooling ribs 170 before reaching the printed circuit board 182 (e.g., the end 162 from which the cooling ribs 170 extend may be closest to the fan 208, although the opposite end 162 could be disposed closest to the fan 208).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive base plate, comprising:
 a bottom comprising a plurality of cooling ribs that are spaced from each other;
 a printed circuit board mounted on said bottom; wherein each adjacent pair of said cooling ribs is separated by a groove comprising a base section, wherein each said base section is coplanar with a primary surface of said printed circuit board that faces away from said bottom; and
 a top disposed opposite of said bottom and that comprises a cavity for receipt of disk drive components.

2. The disk drive base plate of claim 1, wherein each of said cooling ribs is axially extending.

3. The disk drive base plate of claim 1, wherein said plurality of cooling ribs are disposed in parallel relation.

4. The disk drive base plate of claim 1, wherein a length dimension of each of said plurality of cooling ribs extends in a direction of an airflow past said bottom disk drive base plate.

5. An enclosure comprising the disk drive base plate of claim 1 and an airflow source, wherein an airflow generated by said airflow source is parallel to said plurality of cooling ribs.

6. The disk drive base plate of claim 1, wherein each of said plurality of cooling ribs is disposed in a common orientation.

7. The disk drive base plate of claim 1, wherein said plurality of cooling ribs are vertically aligned with a portion of said space that will define a heat-generating region when disk drive components are installed in said space and operated.

8. The disk drive base plate of claim 1, made by the process of die casting.

9. The disk drive base plate of claim 1, a tallest component mounted on said printed circuit board is coplanar with an apex of each of said plurality of cooling ribs.

10. The disk drive base plate of claim 1, wherein an apex of each of said plurality of cooling ribs is contained within a reference plane, wherein each component mounted on said printed circuit board fails to protrude beyond said reference plane.

11. A disk drive, comprising the base plate of claim 1, wherein said disk drive further comprises a data storage disk and head positioner assembly that are each disposed within said cavity.

12. A housing assembly, comprising:
   a housing comprising a first wall that in turn comprises a plurality of cooling ribs; and
   a printed circuit board mounted on said first wall, wherein each adjacent pair of said cooling ribs is separated by a groove comprising a base section, and wherein each said base section is coplanar with a primary surface of said printed circuit board that faces away from said first wall.

13. The housing assembly of claim 12, wherein a length dimension of each of said plurality of cooling ribs extends in a direction of an airflow past said housing.

14. An enclosure comprising the housing assembly of claim 12 and an airflow source, wherein an airflow generated by said airflow source is parallel to said plurality of cooling ribs.

15. The housing assembly of claim 12, wherein each of said plurality of cooling ribs is disposed in a common orientation.

16. The housing assembly of claim 12, wherein an apex of each of said plurality of cooling ribs is contained within a reference plane, wherein each component mounted on said printed circuit board fails to protrude beyond said reference plane.

17. A disk drive comprising the housing assembly of claim 12, wherein said housing further comprises a cavity that is oppositely disposed in relation to said first wall, wherein said disk drive further comprises a data storage disk and head positioner assembly that are each disposed within said cavity.

* * * * *